US008659422B2

(12) United States Patent
Tracy et al.

(10) Patent No.: US 8,659,422 B2
(45) Date of Patent: Feb. 25, 2014

(54) CONDITION, HEALTH, AND USAGE MONITORING SYSTEM

(75) Inventors: Terry A. Tracy, Dickson, TN (US); Behzad Moslehi, Los Altos, CA (US); Gregory A. Ruderman, Valencia, CA (US)

(73) Assignee: Raytheon Company, Waltham, MA (US)

( * ) Notice: Subject to any disclaimer, the term of this patent is extended or adjusted under 35 U.S.C. 154(b) by 529 days.

(21) Appl. No.: 12/508,433

(22) Filed: Jul. 23, 2009

(65) Prior Publication Data

US 2011/0018703 A1 Jan. 27, 2011

(51) Int. Cl.
*G08B 1/08* (2006.01)

(52) U.S. Cl.
USPC .... 340/539.26; 340/506; 340/3.1; 340/539.1; 340/539.11; 340/539.13

(58) Field of Classification Search
USPC ............ 340/539.26, 506, 3.1, 539.1, 539.11, 340/539.13
See application file for complete search history.

(56) References Cited

U.S. PATENT DOCUMENTS 5,959,529 A * 9/1999 Kail, IV .................... 340/539.12
6,396,400 B1 * 5/2002 Epstein et al. ................ 340/550

* cited by examiner

*Primary Examiner* — Daryl Pope
(74) *Attorney, Agent, or Firm* — Schwegman Lundberg & Woessner, P.A.

(57) ABSTRACT

A sensor module includes a number of environment sensors and condition sensor interfaces. Each condition sensor interface is configured to couple with a condition sensor capable of sensing an attribute of a component exposed to the environment. The sensor module may be embedded within a structure associated with the component. For example, in the context of a solid rocket motor, the sensor module may be embedded within the exhaust plug.

15 Claims, 2 Drawing Sheets

US 8,659,422 B2

CONDITION, HEALTH, AND USAGE MONITORING SYSTEM

TECHNICAL FIELD

The present invention generally relates to health and usage monitoring systems, and more particularly relates to the use of such systems to determine the remaining useful life for electronics, propulsion systems, structures, and the like.

BACKGROUND

It is often desirable to provide the capability to determine, prognostically, the remaining useful life for electronics, propulsion components, and other such structures. For example, in the context of solid rocket motors, it would be advantageous to be able to predict the health of such systems prior to use.

In attempting to provide such assessments, presently known health and usage monitoring systems typically provide information regarding the environment in which the component is stored and transported. However, such systems do not sufficiently take into account the wide range of environmental conditions that affect useful life while at the same time effectively monitoring the actual condition and health of the component of interest over time.

Accordingly, it is desirable to provide an embedded, self-powered, and compact sensor module for monitoring both the environment and the usage of a component. Other desirable features and characteristics of the present invention will become apparent from the subsequent detailed description and the appended claims, taken in conjunction with the accompanying drawings and the foregoing technical field and background.

BRIEF SUMMARY

A sensor module in accordance with one embodiment includes a plurality of environment sensors, each environment sensor capable of sensing an attribute of an environment; and a plurality of condition sensor interfaces, each condition sensor interface configured to couple with a condition sensor capable of sensing an attribute of a component exposed to the environment. The sensor module may be embedded within a structure associated with the component.

In a further embodiment, the sensor module includes a housing; a controller within the housing and coupled to the plurality of environment sensors and the plurality of condition sensor interfaces, the controller configured to receive environment data associated with the attributes sensed by the environment sensors, and to receive condition data associated with the attributes sensed by the condition sensor interfaces; a memory coupled to the controller, the memory configured to store the condition data and environment data; a communication module coupled to the controller, the communication module configured to communicate all or a part of the condition data and the environment data to an external device; and a power source coupled to the controller.

In accordance with one embodiment, a method of assessing the health of a component exposed to an environment includes embedding a plurality of condition sensors within the component, each condition sensor capable of sensing an attribute of the component; providing a sensor module within the environment, the sensor module including a plurality of environment sensors, each environment sensor capable of sensing an attribute of the environment; acquiring, via the sensor module, condition data from the condition sensors and environment data from the environment sensors; transferring the condition data and environment data to an external device; assessing the health of the component based on the condition data and the environment data.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following discussion generally relates to methods and apparatus for an integrated health and usage monitoring system module that can measure both environmental conditions and health-related attributes of a component over time. In that regard, the following detailed description is merely illustrative in nature and is not intended to limit the invention or the application and uses of the invention. Furthermore, there is no intention to be bound by any expressed or implied theory presented in the preceding technical field, background, brief summary or the following detailed description. For the purposes of conciseness, conventional techniques and principles related to missile systems, solid rockets, sensors, microprocessors, wireless communication, and the like need not, and are not, described in detail herein.

Figure 1:
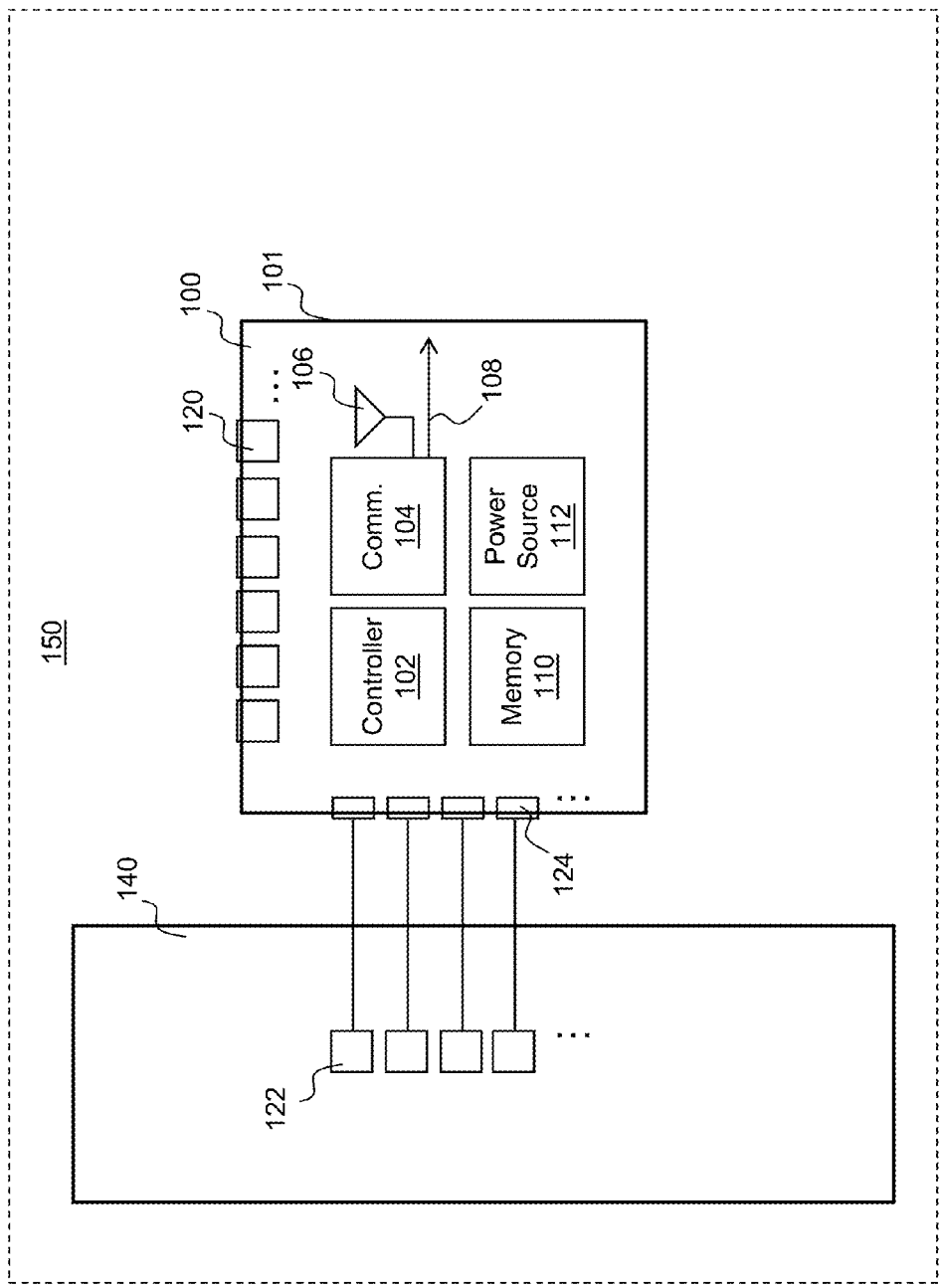
FIG. 1 is a conceptual block diagram of a health and usage monitoring system in accordance with various embodiments of the invention.

Referring now to FIG. 1, in general, an integrated condition, health, and usage monitoring system ("CHUMS module," or simply "module") 100 is provided within an environment 150 shared, at least in part, by a structure or component 140. Module 100 includes a controller (e.g., microprocessor, microcontroller, etc.) 102, a memory or storage device no, a power source 112, and a communication sub-module 104 having an associated transceiver 106 (for wireless communication) and wired data link 108 (for direct communication).

Module 100 includes a plurality of usage environment sensors (or simply "environment sensors") 120 configured to measure one or more attributes of environment 150 (e.g., temperature, humidity, shock, vibration, acceleration, liquid presence, and tamper events, and the like). Module 100 also includes a plurality of condition sensor interfaces 124 configured to interrogate and receive the appropriate sensor information from a plurality of condition sensors 122 (e.g., via a fiber optic interface). Condition sensors 122 are configured to measure various condition and/or health-related attributes of component 140 (e.g., strain, temperature, moisture, and gasses released due to degradation of component 140, etc.).

The various sub modules and components of module 100 work together with environment sensors 120 and condition sensor interfaces 124 to acquire, process, and store the desired environment and condition data for an extended length of time, allowing the data to be retrieved at a later day (i.e., via communications module 104).

As will be described in further detail below, in one example, component 140 is a solid rocket propellant, and condition sensor interfaces 124 are used to sense the internal conditions of the propellant via sensors 122 embedded within the component during manufacturing. In such a case, module 100 may be configured to be imbedded within a structure sharing the same environment 150 as the propellant—e.g., a standard nozzle plug used in connection with storage of the missile or rocket. It will be understood that, while the present invention is often described in the context of rocket engines, the invention is not so limited, and may be used to assess the health and environmental conditions of a wide variety of components.

Module 100 may be mounted near, on, within, or adjacent component 140, as long as it is exposed to the same environment, 150. In a particular embodiment, module 100 is a self-contained, miniaturized unit within a suitable housing 101 that can be integrated into environment 150 in a manner that does not disrupt or significantly affect operation of component 140.

With continued reference to FIG. 1, environment sensors 120 preferably includes a variety of different sensor types, such as temperature, shock, vibration, acceleration, humidity, liquid presence and/or tamper event sensors. Such sensors preferably extend from the housing 101 of module 100 or are configured such that they are exposed to environment 150, either directly or indirectly. Sensors 120 may be coupled directly to controller 102 or may interface through various other electronic components, such as A/D converters and the like. For the purpose of clarity, such additional components known in the art are not illustrated in FIG. 1.

In a particular embodiment, one environment sensor 120 corresponds to a temperature sensor, for example, a thermistor, thermocouple, or any other suitable temperature sensor. In one embodiment, the temperature sensor is capable of measuring external ambient temperature in the range of −55° C. to +125° C. with an accuracy of ±2° C. The sample rate is preferably selectable—e.g., via software—between one sample per hour and one sample every 24 hours. In one embodiment, the default sample rate is one sample every 23 hours and 55 minutes. Furthermore, an external ambient temperature measurement may occur when a shock event is detected that drives a shock and/or vibration measurement.

In a particular embodiment, one environment sensor 120 is a shock sensor. The shock sensor continuously monitors for shock levels that exceed a certain predefined level (e.g., 10.0 Gs) and, once detected, initiates measurement of the shock pulse to determine the peak shock level and pulse width. In one embodiment, the shock sensor is capable of measuring dynamic shock levels of ±10 Gs minimum through ±200 Gs maximum in both Y-axis and Z-axis.

In a typical missile application, the missile X-axis is along the centerline of the longest dimension and the normal direction of propulsion and motion for the majority of missiles. For missiles that are suspended from aircraft wings, the Z-axis is vertical (through the missile hooks or attachment points to the aircraft).

Shock levels greater than ±200 Gs may provide a measurement value of the actual maximum value the sensor is capable of measuring. The shock sensor accuracy in any axis is preferably ±10% of the measured shock value. The pulse width measurement may have an accuracy of ±2 milliseconds following initiation of the measurement.

Environment sensors 120 may also include a vibration/shock sensor and/or accelerometer that continuously monitors for shock and/or vibration levels that exceed a predefined amount (e.g., 10 Gs) and, once detected, initiates short term measurement of vibration to determine the peak root mean squared value of the acceleration provided by earth's gravity ($G_{RMS}$) and time at level. It is preferably capable of measuring dynamic shock levels of ±10 Gs minimum in both Y-axis and Z-axis, or in all three mutually perpendicular axes. In one embodiment, the vibration sensor is capable of measuring vibration levels of 10 $G_{RMS}$ through 200 $G_{RMS}$ over a frequency band from 20 Hz to 2,000 Hz in both Y-axis and Z-axis. The vibration sensor accuracy in any axis is preferably ±10% of the measured value. The time measurement has an accuracy of ±2 milliseconds following initiation of the measurement.

The accelerometer data received from such a vibration/shock/acceleration sensor may be converted into frequency domain Power Spectral Density measures—e.g., within two frequency bands: 20 Hz to 100 Hz (lower frequency band) and 100 Hz to 2,000 Hz (upper frequency band). The total $G_{RMS}$ for each frequency band is then retained.

In another embodiment, environment sensors 120 include a humidity sensor. The humidity sensor provides measurement capability of ambient humidity within environment 150. In one embodiment, the humidity sensor is capable of measuring ambient relative humidity in the range of 5% to 95% throughout a temperature range of 5° C. to 200° C., with an accuracy of ±5% absolute. The humidity sensor may have a response time of one minute to within 95% of the actual ambient level. The humidity sample rate is preferably the same as, and in synch with, that selected for the ambient temperature measurement.

A liquid presence sensor may also be included among environment sensors 120. The liquid presence sensor provides detection capability of the presence of liquid. The phrase "liquid" typically does not include condensation in this context. It is sufficient that the liquid presence sensor be capable of detection without reset capability ("one shot"). The liquid presence sensor might be capable of being reset and/or capable of repetitive detection. The liquid presence sensor may be capable of detecting the presence of liquids throughout a temperature range of 5° C. to 125° C.

Liquids of interest to be detected include, for example, plain water, salt water, JP-10 or JP-4 jet fuel, diesel fuel, and aircraft deicer fluid. The liquid presence sensor is preferably capable of detecting liquid or combinations of liquids with a false alarm rate of less than 5%.

In accordance with one embodiment, environment sensors 120 include a tamper sensor. The tamper sensor provides detection capability of the occurrence of tampering. "Tampering" is defined herein as either physical removal of the module and/or the module electronics module from the installed location or unauthorized manipulation of the data record.

Having thus described a number different environment sensors 120 that may be useful in various contexts, the nature of condition sensors 122 and interfaces 124 will now be described in the context of the solid rocket engine shown conceptually (and not to scale) in FIG. 2. As shown rocket (or missile) 200 includes a casing 206 housing a propellant (or grain) 204 and core 202, as is known in the art. The exhaust nozzle 208 is typically blocked or environmentally sealed, during storage, with a plug 203. During operation, plug 203 is suitably ejected.

As shown, sensor module 100 may be attached to, embedded within, integrated into, or otherwise coupled to plug 203. In this way, sensor module 100 is exposed to (and can make sensor readings of) environment 150. One or more condition sensors embedded within core 202 and/or propellant 204 are coupled to module 100 through the appropriate interfaces (not illustrated in FIG. 2). For example, one or more fiber optic cables or wires 205 may be coupled to one or more sensors 207 distributed along, and even integrated into, fiber 205. In such a case, each fiber 205 may lead from propellant 204 and include a short segment extending to module 100 through a gap between the two, or may directly abut module 100. That is, plug 203 may be in contact with or sufficiently close to propellant 204 that fibers 205 can communicate with the interfaces optically, without the need for a direct connection between the two.

Figure 2:
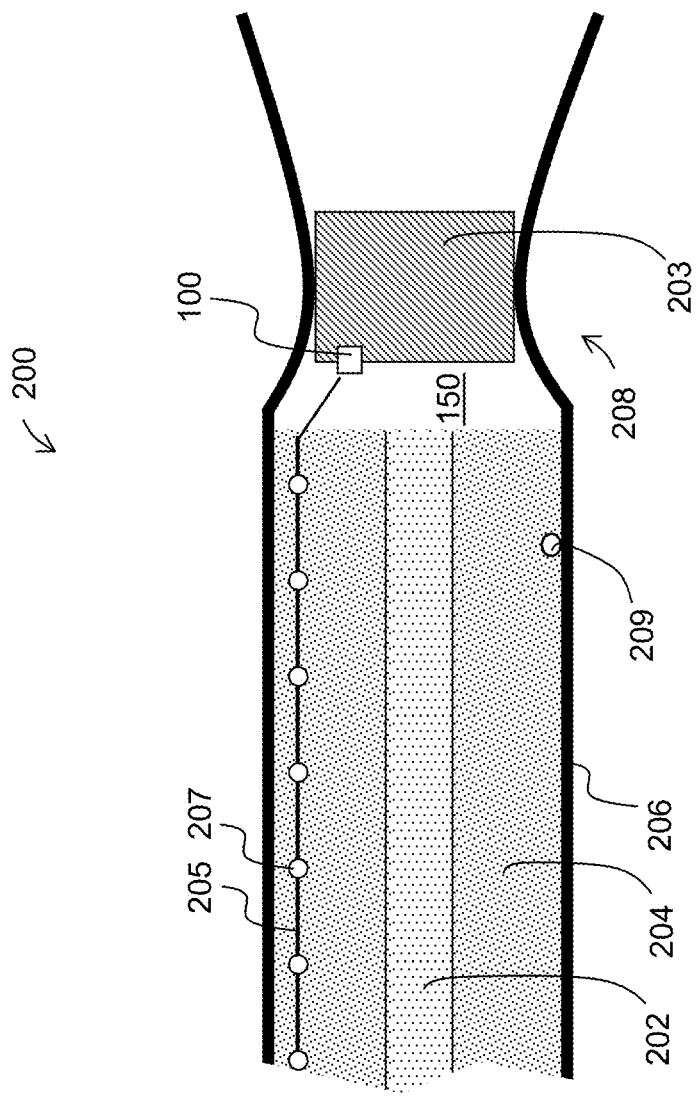
FIG. 2 is a conceptual diagram depicting a particular embodiment of the invention in the context of a solid rocket motor.

In one embodiment, referring now to FIGS. 1 and 2 together, condition sensor sensors 122 include an embedded propellant strain sensor. For example, module 100 may be capable of interfacing with and interrogating approximately one hundred fiber Bragg grating sensors 207, as are known in the art, on a single glass or plastic optical fiber 205 that is embedded in the rocket motor propellant 204 during manufacture by the rocket motor supplier. Interfaces 124 then would typically include one or more fiber Bragg grating sensor interrogators, as is known in the art.

In an alternate embodiment, module 100 has the capability of receiving wireless strain sensor data from installed wireless strain sensors 209 located, for example, in multiple locations around the interior circumference of the rocket motor 200 at the inner liner (e.g., inner perimeter of casing 206).

Embedded gaseous sensor technology may also be included in module to interface with embedded gaseous sensors. Polymeric coatings for selected gases of propellant degradation (i.e., NOx) may be incorporated into the end or ends of fiber or fibers 205. Such polymeric coatings are capable of fluorescing for times dependant upon the exposure to the select gas. These polymeric coatings would be applied to the end of the glass fiber which could then be positioned within the rocket motor propellant core 202.

The module 100 would then provide illumination (through a respective interface 124) to stimulate the fluorescence of the polymeric coating and monitor the relative illumination levels of the fluorescence to determine the time from peak level to the half power level (fluorescence half life).

Other embedded sensors may be used, using either the fiber Bragg grating sensors previously described, wireless embedded sensors, or any other suitable sensors. In various embodiments, for example, embedded temperature sensors and humidity sensors may be employed.

Acquisition and storage of the environment data by and condition data by module 100 may be accomplished in a variety of ways. In one embodiment, the data for each sensor measurement, along with a time and date stamp, is retained in memory 110 in accordance with appropriate data retention storage requirements.

The time and date stamp may be, for example, either Greenwich Mean Time, or a relative time and date stamp in ISO 8601 date and time format, but is preferably consistent throughout the life of the module. Alternative time and date stamp standards may be used, including the Range Commanders Council (RCC) Telecommunications and Timing Group IRIG serial time code formats found in IRIG Standard 200-04 IRIG Serial Time Code Formats, IRIG Standard 205-87 IRIG Standard Parallel Binary and Parallel Binary Coded Decimal Time Code Formats, and IRIG Standard 212-00 IRIG J Asynchronous ASCII Time Code Formats.

In one embodiment, a predetermined number (e.g., ten) highest and lowest temperature sensor measurements for both external ambient temperatures, and also internal temperatures, along with their associated time and date stamps, are retained in a table. Each sample measurement is then compared to the table values and the temperature table is updated to reflect the ten worst case values of both external ambient temperatures and internal temperatures.

In one embodiment, a predetermined number (e.g., ten) highest shock sensor measurements along with their associated time and date stamps and the simultaneous temperature sensor measurements are retained in a table. Similarly, the ten highest total GUMS vibration measurements in the lower frequency band along with the associated time and date stamps and the simultaneous temperature sensor measurements is retained in a lower frequency band vibration table. Similarly, the ten highest total $G_{RMS}$ vibration measurements in the higher frequency band along with the associated time and date stamps and the simultaneous temperature sensor measurements is retained in a higher frequency band vibration table.

Similarly, the ten highest acceleration sensor measurements, ten highest gaseous sensor measurements, ten highest strain sensor measurements, and ten highest relative humidity sensor measurements may be stored, along with their associated time and date stamps.

An initial liquid presence sensor indication along with the associated time and date stamp may also be retained in memory 100. As may an initial tamper occurrence indication along with the associated time and date stamp.

Communication is provided through a wireless interface and transceiver 106 or direct (wired) interface 108. In one embodiment, communication module 104 and transceiver 106 provides for a radio frequency (RF) wireless communication interface that complies with IEEE 802.15.4-2006 protocol and compatible interconnection for data communication devices using low data rate, low power and low complexity, short-range radio frequency (RF) transmissions in a wireless personal area network (WPAN). The RF wireless interface may be implemented with an IEEE 802.15.4 RF communications link operating in the 2.4 GHZ ISM frequency band or other RF interface.

In one embodiment, the RF data packet complies with the IEEE 802.15.4-2006 open communications architecture and optional data communications protocol and format. The radio frequency transceiver provides 2.4 GHz direct sequence spread spectrum (2.450-to-2.483.5 GHz)—16 channels.

The RF wireless communication interface may provide capability for a one-minute maximum time to download and/or program a full memory. The RF wireless bi-directional communication link may have a minimum range of sixty (60) meters line-of-sight in open air, and may support wireless personal area network (WPAN) (mesh mode) of operation where communication can be accomplished among multiple modules that would otherwise be out of the local remote transceiver range.

In a Monitor Mode, module 100 listens for a predetermined time (e.g., 0.1 seconds) once each predetermined time period (e.g., 24 hours) for a synchronization signal. Module 100 then awakens in a transmit mode at the specified synchronized time to transmit requests for data download and/or receive programming.

Power source 112 is preferably capable of providing the necessary operating power for the specified functional capability throughout a ten (10) year minimum period with a goal of a fifteen (15) year operating period. Optionally, power source 112 may be replaced, recharged, or augmented by energy harvesting techniques.

In a preferred embodiment, module 100 provides a non-operational mode that allows packaging, handling, storage and transportation (PHST) environments prior to placement and activation without using any embedded power source energy or recording of environments. Any suitable physical means of activation from the non-operational mode to the fully operational mode may be provided.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient and edifying road map for implementing the described embodiment or embodiments. It should be understood that various changes can be made in the function and arrangement of elements without departing from the scope of the invention and the legal equivalents thereof.

What is claimed is:

1. A sensor module comprising:
   a plurality of environment sensors, each environment sensor capable of sensing an attribute of an environment;
   a plurality of condition sensor interfaces, each condition sensor interface configured to couple with a condition sensor capable of sensing an attribute of a component exposed to the environment;
   a controller coupled to the plurality of condition sensor interfaces, the controller configured to assess the health of the component based on the condition data and the environment data;
   a housing;
   a controller within the housing and coupled to the plurality of environment sensors and the plurality of condition sensor interfaces, the controller configured to receive environment data associated with the attributes sensed by the environment sensors, and to receive condition data associated with the attributes sensed by the condition sensor interfaces;
   a memory coupled to the controller, the memory configured to store the condition data and environment data;
   a communication module coupled to the controller, the communication module configured to communicate all or a part of the condition data and the environment data to an external device;
   a power source coupled to the controller; wherein
      the housing is configured to be integrated into structure adjacent to the environment; and further wherein
      the component is a solid rocket component, and wherein the housing is configured to be integrated into an exhaust plug coupled to the solid rocket component.

2. The sensor module of claim 1, wherein the environment sensors are selected from the group consisting of temperature sensors, shock sensors, vibration sensors, acceleration sensors, humidity sensors, liquid presence sensors and tamper-event sensors.

3. The sensor module of claim 1, wherein the condition sensor interfaces are configured to be coupled with sensors selected from the group consisting of strain sensors, temperature sensors, moisture sensors, and degradation-gas sensors.

4. The sensor module of claim 3, wherein at least one of the condition sensor interfaces is configured to interface with an optical fiber that is embedded within the component and is configured to communicate a signal associated with at least one of the condition attributes.

5. The sensor module of claim 4, wherein the optical fiber is configured to communicate a signal associated with at least two of the condition attributes.

6. The sensor module of claim 4, wherein the optical fiber includes a plurality of fiber Bragg grating sensors distributed along its length.

7. The sensor module of claim 4, wherein the optical fiber includes a polymeric coating that responds to the presence of a predetermined gas.

8. The sensor module of claim 1, wherein the communication module is configured to enter a monitoring mode at predetermined periods, and during the monitoring mode listen for a synchronization signal indicating that a communication event is to take place.

9. The sensor module of claim 1, wherein the power source is configured to receive energy via one or more energy harvesting components coupled thereto.

10. A sensor module comprising:
    a plurality of environment sensors, each environment sensor capable of sensing an attribute of an environment;
    a plurality of condition sensor interfaces, each condition sensor interface configured to couple with a condition sensor capable of sensing an attribute of a component exposed to the environment;
    a controller coupled to the plurality of condition sensor interfaces, the controller configured to assess the health of the component based on the condition data and the environment data;
    a housing;
    a controller within the housing and coupled to the plurality of environment sensors and the plurality of condition sensor interfaces, the controller configured to receive environment data associated with the attributes sensed by the environment sensors, and to receive condition data associated with the attributes sensed by the condition sensor interfaces;
    a memory coupled to the controller, the memory configured to store the condition data and environment data;
    a communication module coupled to the controller, the communication module configured to communicate all or a part of the condition data and the environment data to an external device; and
    a power source coupled to the controller;
    wherein only the n highest and/or m lowest values of the condition data are stored for at least some of the condition attributes, where n and m are predetermined integers.

11. A sensor module comprising:
    a plurality of environment sensors, each environment sensor capable of sensing an attribute of an environment;
    a plurality of condition sensor interfaces, each condition sensor interface configured to couple with a condition sensor capable of sensing an attribute of a component exposed to the environment;
    a controller coupled to the plurality of condition sensor interfaces, the controller configured to assess the health of the component based on the condition data and the environment data;
    a housing;
    a controller within the housing and coupled to the plurality of environment sensors and the plurality of condition sensor interfaces, the controller configured to receive environment data associated with the attributes sensed by the environment sensors, and to receive condition data associated with the attributes sensed by the condition sensor interfaces;
    a memory coupled to the controller, the memory configured to store the condition data and environment data;
    a communication module coupled to the controller, the communication module configured to communicate all or a part of the condition data and the environment data to an external device; and
    a power source coupled to the controller;
    wherein only the n highest and/or m lowest values of the environment data are stored for at least some of the environment attributes, where n and m are predetermined integers.

12. A method of assessing the health of a component exposed to an environment, the method comprising:
- embedding a plurality of condition sensors within the component, each condition sensor capable of sensing an attribute of the component;
- providing a sensor module within the environment, the sensor module including a plurality of environment sensors, each environment sensor capable of sensing an attribute of the environment;
- acquiring, via the sensor module, condition data from the condition sensors and environment data from the environment sensors;
- transferring the condition data and environment data to an external device;
- assessing the health of the component based on the condition data and the environment data; wherein
- the housing is configured to be integrated into structure adjacent to the environment; and
- further wherein the component is a solid rocket component, and wherein the housing is configured to be integrated into an exhaust plug coupled to the solid rocket component.

13. A health and usage monitoring system comprising:
- a plurality of condition sensors embedded within a component, each condition sensor capable of sensing an attribute of the component as it is exposed to an environment;
- a sensor module comprising a plurality of environment sensors, each environment sensor capable of sensing an attribute of the environment; and a plurality of condition sensor interfaces, each condition sensor interface configured to couple with one or more of the condition sensors;
- a controller configured to store data associated with the attributes of the environment and the attributes of the component; and
- a communication module coupled to the controller and configured to wirelessly transmit the data to an external device;
- wherein the controller is configured to assess the health of the component based on the condition data and the environment data; and further wherein
- the component comprises a solid rocket component, and the sensor module is configured to be embedded within a exhaust plug of the solid rocket component.

14. The system of claim 13, wherein the plurality of condition sensors include at least one fiber having a plurality of fiber Bragg gratings incorporated therein.

15. The system of claim 13, further including a power source within the sensor module.

* * * * *

UNITED STATES PATENT AND TRADEMARK OFFICE
CERTIFICATE OF CORRECTION

PATENT NO. : 8,659,422 B2
APPLICATION NO. : 12/508433
DATED : February 25, 2014
INVENTOR(S) : Tracy et al.

Page 1 of 1

It is certified that error appears in the above-identified patent and that said Letters Patent is hereby corrected as shown below:

In the Specification

Column 2, line 41, delete "no," and insert --110,--, therefor

Column 3, line 23, delete "Sensors" and insert --Environment sensors--, therefor Column 5, line 8, before "sensors", delete "sensor", therefor Column 6, line 3, delete "GUMS" and insert --$G_{RMS}$--, therefor In the Claims Column 10, line 3, In Claim 13, after "and", insert --¶--, therefor Signed and Sealed this
Eleventh Day of November, 2014

Michelle K. Lee
*Deputy Director of the United States Patent and Trademark Office*